United States Patent [19]

Borel

[11] 4,438,985
[45] Mar. 27, 1984

[54] BALL BUSHING OF SIMPLIFIED CONSTRUCTION

[75] Inventor: Denis Borel, Wallisellen, Switzerland

[73] Assignee: SRO Kugellagerwerke J. Schmid-Roost AG, Switzerland

[21] Appl. No.: 436,657

[22] Filed: Oct. 26, 1982

[30] Foreign Application Priority Data

Nov. 3, 1981 [CH] Switzerland ............ 7006/81

[51] Int. Cl.³ .................................... F16C 29/06
[52] U.S. Cl. ........................................... 308/6 C
[58] Field of Search ............ 308/3 R, 6 A, 6 B, 6 C, 308/6 R, 217

[56] References Cited

U.S. PATENT DOCUMENTS

| 3,476,445 | 11/1969 | Carlson et al. | 308/6 C |
| 3,512,849 | 5/1970 | Weisel | 308/6 C |
| 3,751,121 | 8/1973 | Geffner | 308/6 C |
| 3,879,093 | 4/1975 | Betrix | 308/6 C |

FOREIGN PATENT DOCUMENTS

| 2406046 | 8/1975 | Fed. Rep. of Germany | 308/6 C |
| 1575608 | 2/1981 | Fed. Rep. of Germany | |
| 134667 | 3/1979 | German Democratic Rep. | |
| 527378 | 10/1972 | Switzerland | |
| 1321362 | 6/1973 | United Kingdom | 308/6 C |

Primary Examiner—Stuart S. Levy
Assistant Examiner—David Werner
Attorney, Agent, or Firm—Ostrolenk, Faber, Gerb & Soffen

[57] ABSTRACT

The disclosure concerns a ball bushing which is adapted for unlimited longitudinal movement on a shaft. The ball bushing includes a sleeve having a plurality of longitudinally extending ball channels defined in it. Each ball channel has two longitudinally extending sections which are joined by two curved sections at the end of the longitudinal sections. A needle is positioned in and extends the length of each channel and the longitudinal sections of the ball channel are shaped and positioned so that the needle contacts and guides and prevents falling out of the balls in each longitudinal section. The curved sections of the ball channel wrap part way around the needle.

14 Claims, 2 Drawing Figures

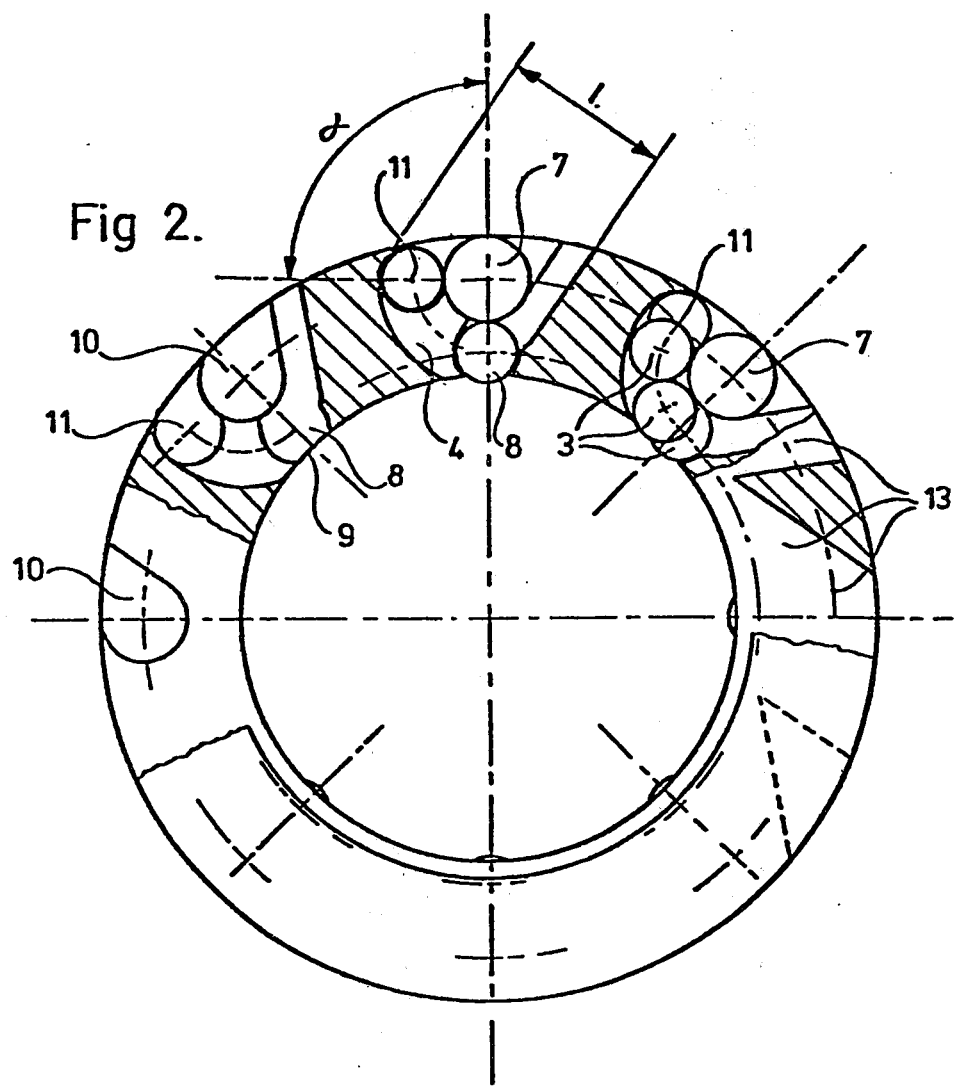

BALL BUSHING OF SIMPLIFIED CONSTRUCTION

BACKGROUND OF THE INVENTION

The present invention relates to a ball bushing designed for enabling unlimited longitudinal movement and which is of substantially simpler construction than known comparable ball bushings.

Ball bushings have been known for a long time. They have been the subject of continuous development and today replace many different types of longitudinal guides, such as slide boxes or ground, scraped or roller guides. Ball bushings provide advantages, such as low friction, reliability of operation and long life. This is similar to the benefits realized with anti-friction bearings as compared, for instance, with slide bearings. However, known ball bushings described, for instance, in U.S. Pat. Nos. 3,512,849 and 3,545,826 or Federal Republic of Germany Patent No. 15 75 608 and Federal Republic of Germany OS No. 23 28 180 are relatively complicated constructions consisting of different individual parts manufactured and assembled by different methods such as lathework, grinding, hardening, embossing, shaping, stamping or extrusion. Only the balls for these bushings can be obtained readily on the market.

SUMMARY OF THE INVENTION

The object of the present invention is to eliminate the above described drawbacks and to provide a ball bushing which is low in cost to manufacture, due to the reduction in the number of parts used, is high in quality, due to the use of precision parts available on the market and which has high load-carrying force and has long life due to optimum utilization of space.

The ball bushing according to the invention is comprised of a cylindrical sleeve which has been molded so as to define a plurality of longitudinally extending recesses at spaced intervals around the sleeve. The recesses have a wide opening at the exterior surface of the sleeve and a narrow opening at the interior surface of the sleeve, for reasons discussed below. Each recess in the sleeve serves as a ball channel for balls of the bushing. Each ball channel includes two longitudinal sections extending along the axis of the sleeve, and the ends of the longitudinal sections are joined by curved sections of the ball channel, defining a complete raceway for the balls. The balls are held in all of the sections of their ball channel by a needle comprised of steel or other rigid material. The needle is mounted in the recess to be radially outside the one longitudinal section of the ball channel that is toward the interior surface of the sleeve. The other longitudinal section of the ball channel is located toward the exterior surface of the sleeve, but positioned for being contacted by the needle. Through the opening at the interior surface of the sleeve, the balls in the radially more inward longitudinal section contact a shaft, or the like, on which the bushing is placed. The curved sections of the ball channel are curved so as to complete the raceway for the balls. In addition, the curved sections curve around part of the periphery of the needle, as they extend between the adjacent ends of the two longitudinal sections, and particularly the curved sections curve around about one quarter of the circumference of the needle.

The ball bushing of the invention is comprised only of a single sleeve which is formed in one molding operation, and of balls and steel needles which are readily available as standard mass-produced parts on the market, such as those used in every ball or needle bearing. The assembly of these three elements is effected in an extremely simple manner, i.e. by placing the balls in the channels of the sleeve and by snapping the steel needles into the mounts. This assembly is without additional operations, such as welding or mechanical shaping, and without additional parts, such as, for instance, side disks or spring washers.

Other objects and features of the invention will be explained with reference to the following Figures which show an illustrative embodiment of the invention.

BRIEF DESCRIPTION OF THE DRAWINGS

FIG. 2 is a front view, also partially in cross-section, of the ball bushing.

DESCRIPTION OF A PREFERRED EMBODIMENT

Figure 1:
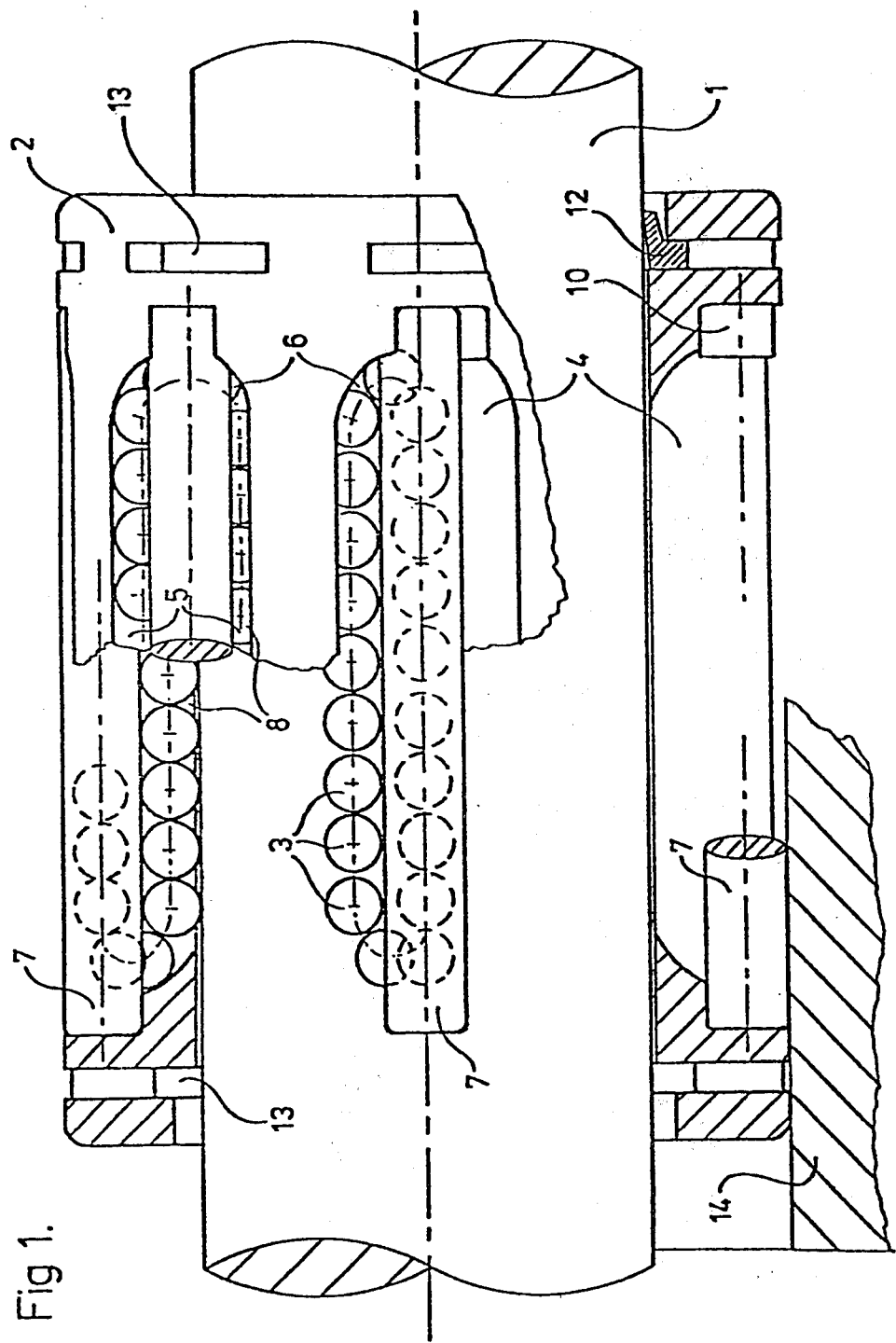
FIG. 1 is a side view, partially in cross-section, of the ball bushing of the invention.

A ball bushing in accordance with FIGS. 1 and 2 is comprised only of the following parts, a sleeve 2 of a plastic material, balls 3, which are supported in channels in the sleeve, and needles 7 which are mounted to the sleeve and which are placed for holding the balls in the sleeve and for guiding their movement in ball receiving channels in the sleeve. The sleeve 2 is hollow. At spaced intervals around the sleeve, it is shaped to define in it a plurality of concave recesses which are, in turn, internally shaped (as shown at the top and upper left quadrant in FIG. 2), to comprise two smaller diameter, concave, longitudinally extending recesses for defining the two parallel, linear, longitudinal sections 5 of the ball channel 4 in the recess. The recess above the longitudinal sections 5 is also sized so as to receive the below-described needle 7. The ends of the longitudinal sections of the ball channel are connected together by two oppositely curved, small radius curved sections 6, for defining a continuous ball raceway including the longitudinal sections 5 and the curved sections 6. As can be seen in FIG. 1, the curved sections 6 of the ball channel 4 are curved around axes transverse to the sleeve, so as to join the ends of the longitudinal sections 5 of the ball channel. However, as can be seen in the upper right quadrant of FIG. 2, the curved sections 6 of the ball channel are each also curved around an axis defined at the center of the needle 7 (described below), so that the needle 7 will hold the balls in the curved sections 6 as they move through the raceway of the ball channel.

As can be seen at the top of FIG. 2, one longitudinal section 5 of the ball channel is nearer to the exterior surface of the sleeve, and supports balls 3 at the exterior surface. This is the return section 11 of the ball channel. The other longitudinal section 5 of the channel is nearer to the interior surface of the sleeve, for supporting the balls at the interior surface. This is the load bearing longitudinal section of the bushing. The two longitudinal sections are respectively toward the exterior and the interior of the sleeve so that the balls will be available to serve the bushing both at the exterior and the interior and, more important, so that the circular needle 7 will be able to hold all of the balls 3 in all of the sections 5 and 6 of the ball channel.

For each ball channel 4 there is a respective elongate, straight, round, thin and rigid steel needle 7. The needle extends the length of the ball channel 4. Because of the placement of the longitudinal sections 5 in the respective recess, the needle 7 is radially above or outside the balls 3 in the radially more inward one of the two longitudinal sections 5 of the ball channel and is circumferentially next to the balls in the other radially more outward longitudinal section 5 of the ball channel. The steel needles simultaneously serve as retainers for all of the balls in the respective sections of the ball channel and serve as raceways for the load-bearing balls 3 of the longitudinal section at the interior surface of the sleeve. As shown at the upper quadrant in FIG. 2, the curved sections 6 of the ball channels wraps circumferentially around part of the periphery of the steel needle, and particularly about 90° or one quarter of the way around the periphery. In the embodiment illustrated, the balls have a diameter which is between 65% and 75% of the diameter of the needle.

The result of all the foregoing dimensions, placement and geometry is the following. The width "1" of the ball channel 4 between its outer sides, is smaller than the total of the diameters of two balls and the diameter of a respective steel needle 7. This, of course, gives the needle and ball channel the triangular cross-sectional configuration seen at the top of FIG. 2. The longitudinal channel sections 5 and the needles 7 are so placed that an imaginary connecting line drawn from the center of a needle to the center of the bushing itself or to the center of a shaft 1 on which the bushing is positioned merges with an imaginary connecting line drawn from the center of the needle 7 to the centers of the balls 3 in the longitudinal section of the ball channel at the interior surface of the sleeve. Furthermore, between the imaginary connecting line from the center of the balls of the other or return row 11 and the needle meets the imaginary connecting line from the center of the needle to the centers of the balls of the load-bearing row at about 90°.

The radially inner longitudinal section of the ball channel is placed so that its radially inner side opens in a narrow longitudinally extending opening 9 through the interior wall of the sleeve. The width of the opening is narrower than the diameter of the balls in that ball channel section. On the one hand, this enables the balls 3 to contact the shaft 1 while, on the other hand, this prevents the balls 3 from falling out of the recess through the opening 9 to the inside when the shaft 1 is not inserted in the sleeve. Shaft 1, on which the bushing is seated, balls 3, needle 7 and housing 14 within which the ball bushing is inserted are in contact and thus form the working region 8.

The steel needles 7 are held and guided in the sleeve 2 in mounts 10 which are snap fasteners at the ends of each ball channel 4. The total length of a channel 4 is shorter than that of its steel needle 7. The mounts 10 are produced during the same operation when the rest of the sleeve 2 is shaped. The sleeve 2 is preferably made of plastic, for instance polyacetal, and is preferably formed as an injection molding.

With the steel needles 7 snapped in place, the balls 3 of the returning ball row 11 are both prevented from falling out and are supported by the inwardly inclined shape of the ball-channel paths 4.

During the production, e.g. molding, of the sleeve 2, segment-like openings 13 are produced on both ends of the sleeve 2, to receive elastic packings 12 which are inserted from the inside of the sleeve. The segment-like openings 13 may also be provided with a special spring washer (not shown) with internal teeth corresponding to the shape of the openings 13 and which is mounted from the outside for the axial fixing in place of the ball bushing with respect to the housing 14.

A variant that has not been shown, but that can also be readily produced, has a paraxial opening extending over the entire length of the ball bushing, and that opening has an opening angle of between 45° and 90°. Since the sleeve consists of plastic, it has elasticity. Both in the closed embodiment and in the open embodiment, if desired, the resultant radial play in the sleeve can be adjusted by a flexibly developed housing wall 14 outside the bushing.

Although a preferred embodiment of this invention has been described, many variations and modifications will now be apparent to those skilled in the art, and it is therefore preferred that the instant invention be limited not by the specific disclosure herein, but only by the appending claims.

What is claimed is:

1. A ball bushing, comprising:
   a hollow cylindrical sleeve with an exterior surface and an interior surface; at least one recess in the sleeve extending from the exterior surface to the interior surface for defining a ball channel; the ball channel defined in the recess being comprised of two longitudinal sections extending generally along the axis of the sleeve and of two curved sections joining the ends of the longitudinal sections, thereby forming a complete ball raceway in the longitudinal and curved sections of the ball channel; the longitudinal and curved sections all being shaped for guiding movement of balls therealong; a plurality of balls disposed in the ball channel for movement therealong;
   a circular cross-section needle positioned in the recess and extending the length of the ball channel, and located radially outside one of the longitudinal sections of the ball channel, the needle having a center and being defined by a circular periphery; the needle being longer than the ball channel; the balls in the longitudinal sections of the ball channel being guided along the periphery of the needle, and in the curved sections of the ball channel, which partially wrap about the circular periphery of the needle, the balls being guided around the periphery of the needle, the curved sections being concavely curved around the needle;
   the needle and the longitudinal sections of the ball channel being so shaped and so positioned that the centers of the balls in the longitudinal and in the curved sections of the ball channel are approximately the same distance from the center of the needle, the axes of the longitudinal sections of the ball channel continuously are approximately the same distance from the axis of the needle, and the balls and the needle being sized so that all balls in all sections of the ball channel are always in contact with the needle for being guided thereby and for being held in the ball channel.

2. The ball bushing of claim 1, wherein the curved sections of the ball channel wrap about one quarter of the circular periphery of the needle.

3. The ball bushing of claim 2, wherein the first longitudinal section of the ball channel is at the interior surface of the sleeve while the second longitudinal section of the ball channel is generally at the exterior surface of the sleeve; the recess in the sleeve being open through an opening in the interior surface of the sleeve for enabling the balls in the first longitudinal section to project through the interior surface, but the opening at the interior surface of the sleeve being narrow enough to retain the balls in the first longitudinal section; and the needle being at the side of the balls in the first longitudinal section opposite the opening in the sleeve, the balls in the first longitudinal section serving as the load-bearing row of balls.

4. The ball bushing of claim 1, wherein the one longitudinal section of the ball channel having the needle radially outside thereof defines the load-bearing row of balls, while the other longitudinal section of the ball channel defines the returning row of balls; the load-bearing row of balls being exposed to the interior of the sleeve;

the angle between a first line connecting the centers of the balls in the return row and the center of the needle, and a second line connecting the centers of the balls in the load-bearing row and center of the needle is approximately 90°.

5. The ball bushing of claim 4, wherein the second line also intersects the axis of the sleeve.

6. The ball bushing of claim 1, wherein the balls have a diameter which is between 65% and 75% of the diameter of the needle.

7. The ball bushing of claim 1, wherein between the external sides of the ball channel, located at the outward sides of the balls in the longitudinal sections, the ball channel has a width which is smaller than the sum of two ball diameters plus the diameter of the needle, and which is larger than the sum of two ball diameters.

8. The ball bushing of claim 1, further comprising mounts located on the sleeve at opposite ends of the ball channel for mounting the needle in the ball channel.

9. The ball bushing of claim 1, wherein the longitudinal sections are straight and parallel to each other and are parallel to the sleeve axis.

10. The ball bushing of claim 1, wherein the needle is made from steel.

11. The ball bushing of claim 1, wherein there are a plurality of the recesses each respectively provided with the ball channel, balls and needle.

12. The ball bushing of claim 1, wherein a first one of the longitudinal sections of the ball channel is at the interior surface of the sleeve while a second one of the longitudinal sections of the ball channel is generally at the exterior surface of the sleeve; the recess in the sleeve being open through an opening in the interior surface of the sleeve for enabling the balls in the first longitudinal section to project through the interior surface, but the opening at the interior surface of the sleeve being narrow enough to retain the balls in the first longitudinal section; and the needle being at the side of the balls in the first longitudinal section opposite the opening in the sleeve, the balls in the first longitudinal section serving as the load-bearing row of balls.

13. The ball bushing of claim 12, wherein the second longitudinal section is radially more outward than the first longitudinal section, and the first and second longitudinal sections being shaped for holding the balls therein with the needle in contact with the balls in both longitudinal sections.

14. The ball bushing of claim 13, wherein the recess in the sleeve is open at the exterior surface of the sleeve for enabling installation through the exterior surface of the sleeve of the balls in the ball channel and of the needle for holding the balls in the ball channel.

* * * * *